United States Patent [19]
Baker

[11] Patent Number: 5,845,972
[45] Date of Patent: Dec. 8, 1998

[54] HIGH STRENGTH WHEEL WITH DECORATIVE COVER

[76] Inventor: Scott B. Baker, 15759 Lassen, North Hills, Calif. 91343

[21] Appl. No.: 757,458

[22] Filed: Nov. 27, 1996

[51] Int. Cl.[6] ..................................................... B60B 7/14
[52] U.S. Cl. ..................................... 301/37.38; 301/37.37; 301/108.5; 301/35.62
[58] Field of Search ................................. 301/37.1, 37.37, 301/37.38, 37.42, 108.4, 108.5, 35.62, 63.1, 64.4, 105.1

[56] References Cited

U.S. PATENT DOCUMENTS

| | | | |
|---|---|---|---|
| 2,159,881 | 5/1939 | Booth | 301/37.38 |
| 2,249,568 | 7/1941 | Shinliver | 301/37.38 X |
| 3,287,067 | 11/1966 | Brown | 301/37.38 |
| 3,397,919 | 8/1968 | Aske, Jr. | 301/37.42 |
| 4,179,163 | 12/1979 | Brown | 301/37.38 X |
| 4,441,762 | 4/1984 | Segal | 301/37.42 X |
| 4,447,091 | 5/1984 | Nguyen et al. | 301/37.38 X |
| 4,971,396 | 11/1990 | Morris | 301/108.4 X |

FOREIGN PATENT DOCUMENTS

| | | | |
|---|---|---|---|
| 135728 | 12/1933 | Australia | 301/37.38 |
| 1004084 | 3/1952 | France | 301/37.38 |
| 174839 | of 0000 | United Kingdom | 301/37.38 |

Primary Examiner—Russell D. Stormer
Attorney, Agent, or Firm—Roger A. Marrs

[57] ABSTRACT

A wheel having a decorative member with a central opening for accommodating passage of a threaded shank extending from a securement cap is disclosed. The cap includes a holding flange adapted to bear against the outside surface of the decorative member while a retaining collar threadably receives the threaded shank and bears against the inner surface of the decorative member. The collar includes an inner flange with holes for accommodating fasteners that engage with the central hub region of a conventional wheel. Threaded engagement of the cap with the collar clamps the decorative member therebetween and a lock bolt may be employed to secure the cap in position with the decorative member.

5 Claims, 1 Drawing Sheet

HIGH STRENGTH WHEEL WITH DECORATIVE COVER

BACKGROUND OF THE INVENTION

1. Field of the Invention

The present invention relates to the field of automotive accessories, and more particularly to a novel high strength wheel having an interchangeable decorative cover decorative enhancement.

2. Brief Description of the Prior Art

In the past, the conventional aluminum wheel design has employed elaborate "center" decorations and designs which require removal of substantial material from the wheel itself in order to create the design. The most limiting factor to the creative expression or enhancement of the "center" of the wheel is the direct effect the design has on the strength of the wheel due to the metal removal necessary to create the design. Therefore, problems and difficulties have been encountered with employing conventional wheel design, which stem largely from the fact that the design enhancement is greatly limited due to the required removal of wheel material which then greatly weakens the strength of the wheel. Also, wheel center design is generally unchangeable and requires the placement of new wheels with different designs to achieve design change.

The "center" area of the wheel is important because of required strength since most of the load and stress-bearing portion of the wheel is in this area. Also, the center area of the wheel may be considered a "blank canvas" since the design is carried thereon. A design is placed in this area by the removal of material and more material removed, the lesser strength remains to accommodate the load and stresses encountered during use.

Therefore, a long-standing need has existed to provide a novel wheel design and cover arrangement which will have high strength but which will permit a variety of design configurations to be placed in the central area of the wheel. Strength of the wheel should not be adversely affected and interchangeability of different designs should be accommodated.

SUMMARY OF THE INVENTION

Accordingly, the above problems and difficulties are avoided by the present invention which provides a novel high strength wheel which includes a decorative member incorporating a design by the removal of material. The decorative member is not a load-bearing member and therefore, creative expression is unlimited. The center of the decorative member includes a central opening for insertably receiving a threaded shank carried on a securement cap. The cap includes an outwardly projecting flange which bears against one side of the decorative member when the threaded shank is passed through the opening. The opposite side of the decorative member is against one end of an internally threaded collar which receives the threaded shank and as the cap is tightened, a clamping action secures the decorative member in position therebetween. The collar includes an internal flange with a plurality of holes for insertably receiving bolts which threadably engage with threaded openings in the central region or hub region of a conventional wheel. A lock bolt may pass through the cap flange and engage with a selected one of a plurality of threaded openings around the central opening of the decorative member. Therefore, the wheel may maintain its high strength characteristics in the central hub region while the decorative member may be detachably connected therewith and does not form a part of the load-bearing assembly.

Therefore, it is among the primary objects of the present invention to provide a novel high strength wheel having a design center which is not subjected to loads and stresses normally encountered during road conditions.

Another object of the present invention is to provide a novel decorative wheel cover which can be attached to a conventional wheel with safety and which permits a variety of design options to be selected which are unavailable at the present time.

Yet another object of the present invention is to provide a novel decorative interchangeable wheel cover which will permit quick change wheels to be incorporated.

Still a further object of the present invention is to provide a novel wheel which has a detachable decorative member that is not load-bearing and which offers a variety of decorative options.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
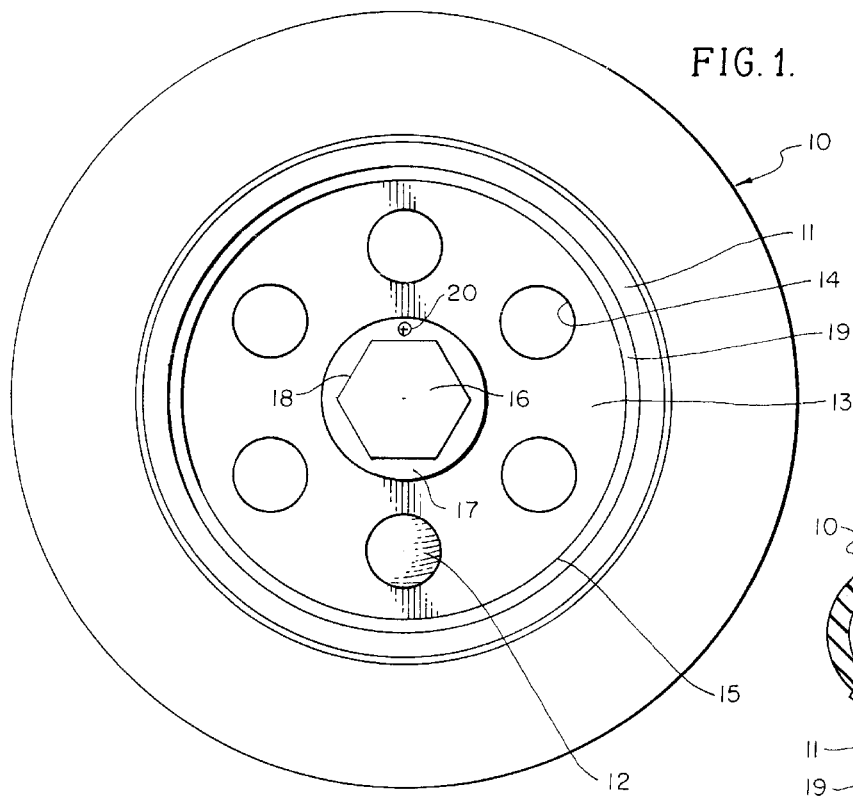
FIG. 1 is a front elevational view illustrating the novel interchangeable or detachable wheel cover of the present invention installed on a wheel.

Referring to FIG. 1, a conventional wheel with a tire mounted thereon is indicated by numeral 10 and the wheel is indicated by numeral 11 representing the rim with a central hub area indicated by numeral 12. The hub area 12 is covered by a decorative member 13 which has areas of material removed to provide a suitable decoration. For example, material has been removed from the member 13 to provide a plurality of circles, such as circle 14, which are arranged in coaxial relationship about the center of the member and within the edge marginal region 15 of the member 13. The decorative member 13 is held in position on the wheel by means of a securement cap 16 having an outwardly extending flange 17 which bears against the external or other surface of the decorative member 13. The cap 16 includes a plurality of flats, such as flat 18, for receiving a suitable assembly tool such as a wrench or socket. The cap 16 is detachably secured to the decorative member by means of a lock fastener or bolt 20 which passes through the flange 17 into engagement with a selected opening in the decorative member 13.

It can be seen that the decorative representation carried by the member 13 in no way weakens or reduces the strength of the hub area 12 of the wheel. Also, by removing the securement cap 16, the decorative member 13 can be readily changed so that a replacement decorative member with different graphics or design can be assembled with the wheel. A suitable seal 19 is disposed between the edge marginal region of the decorative member 13 and is in contact with the wheel.

Figure 2:
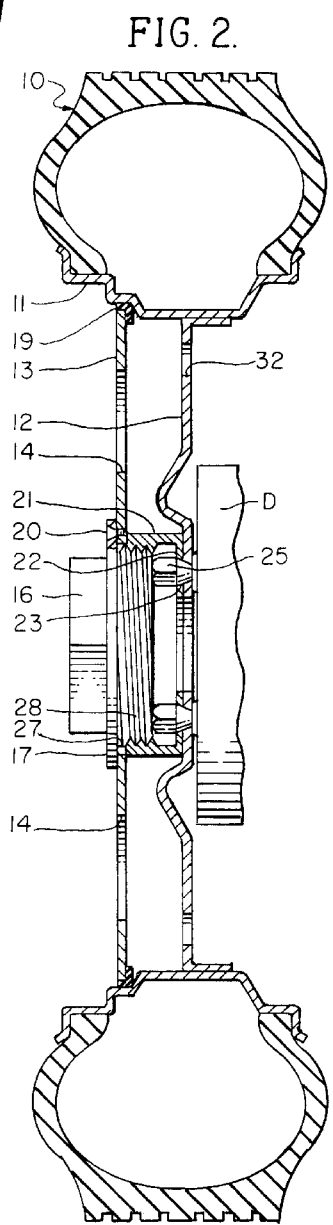
FIG. 2 is a transverse cross-sectional view of the wheel cover and wheel shown in FIG. 1.
Figure 3:
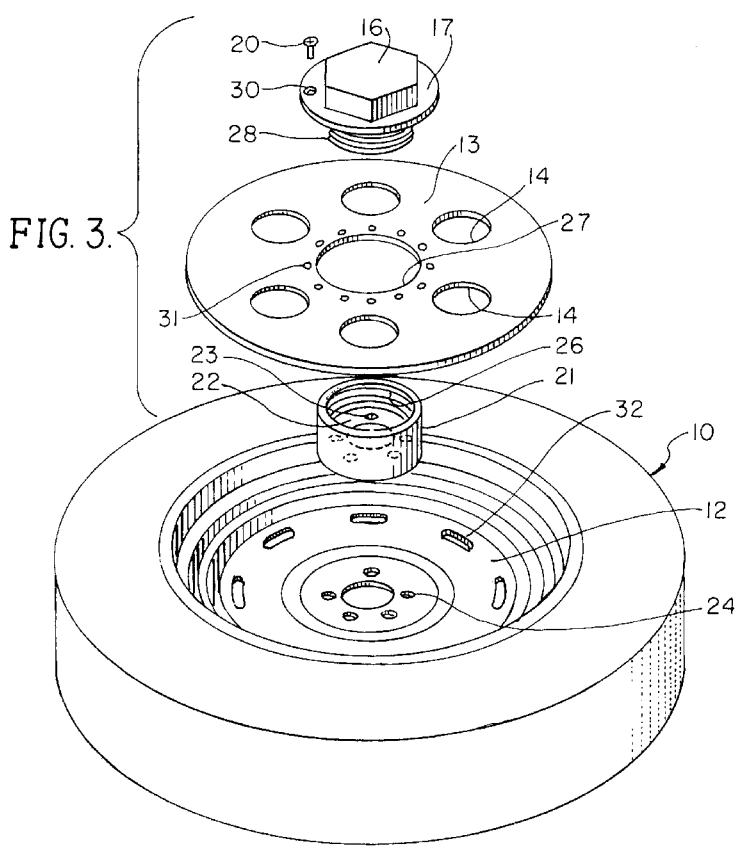
FIG. 3 is an exploded perspective view showing the components of the wheel cover preparatory for installation on a conventional wheel.

Referring now in detail to FIGS. 2 and 3, it can be seen that the assembly further includes a circular collar 21 having an inner flange 22 which is provided with a circular arrangement of holes, such as hole 23, which are aligned with holes 24 in the hub area 12. Studs carried on the wheel drum 240, as seen in FIG. 2, project through the holes 24 and the aligned holes 23 so that retaining nuts 25 can be installed on the exposed end of the studs. Thus, the collar 21 is fixedly attached to the wheel drum and wheel in a secure manner. It is also to be seen that the inner bore of the collar 21 is threaded, as indicated by numeral 26, and that the threaded bore is in position with respect to a central opening 27 in the decorative member 13 to insertably and threadably receive a threaded shank 28 of the securement cap 16. Therefore, the decorative member 13 is clamped between the opposing surfaces of the clamp 21 and the securement cap flange 17. The nut or bolt 20 can then be inserted through hole 30 and into threaded connection with an aligned hole selected from a plurality of holes surrounding the central opening 27. Such a selected hole is indicated by numeral 31. Once assembled, or during the assembly, sealing material 19 may be applied to the edge marginal region of the decorative member 13 and the adjacent portion of the wheel. Usually this position will occur adjacent to the rim 11 of the wheel structure. The hub area or portion of the wheel, indicated by numeral 12, may include a plurality of vent openings 32 so that a flow of air can pass therethrough for cooling purposes with respect to the brake assembly and wheel drum assembly 240.

In view of the foregoing, it can be seen that the decorative member 13 provides a cover for the central portion of the wheel and that the securement cap 16 retains the decorative member 13 in position in cooperation with the collar 21. The decorative member is available for quick change by removing the lock screw or bolt 20 followed by unscrewing the securement cap 16 and removing the ornamental decorative member or plate 13. Next, a decorative plate with different design is installed against the collar 21 followed by threadably engaging the shank 28 with the threaded bore 26 so that the securement cap 13 is in clamping relationship to hold the member or plate 16 in position. Next, the hole 30 is aligned with a selective hole 31 on the decorative member and screw or bolt 20 is installed to lock the cap in place.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A high strength wheel and interchangeable decorative member assembly comprising:

a wheel having a recessed hub area with openings for receiving studs on a wheel drum;

said recessed hub area defined by an encircling rim defining an exposed opening leading into said recessed hub area;

a support collar having an internal threaded bore terminating in an inwardly disposed flange;

said flange provided with openings in register with said hub area openings for insertably receiving said studs whereby said studs are within said bore and encircled by said support collar;

fasteners detachably coupled with said studs securing said support collar to said hub area;

a decorative member having a central area defining a central opening;

a securement cap threadably engageable with said support collar so as to bear against said central area of said decorative member in clamping relationship therebetween; and said decorative member being non-load bearing with a peripheral edge terminating in fixed spaced-apart relationship with respect to said wheel rim.

2. The high strength wheel and interchangeable decorative member as defined in claim 1 wherein:

said decorative member substantially occupies said exposed opening leading into said recessed hub area.

3. The high strength wheel and interchangeable decorative member as defined in claim 2 including:

detachable safety-lock means releasably securing said securement cap with said decorative member;

said safety-lock means includes a plurality of threaded openings surrounding said central area opening of said decorative member and in spaced-apart relationship with each other;

a threaded security fastener carried on said securement cap engageable with a selected one of said central area openings for releasable threadable retention therewith; and said securement cap includes a circular flange with a single security hole adapted to be registered with said selected hole in said decorative member for receiving said threaded security fastener.

4. The high strength wheel and interchangeable decorative member as defined in claim 3 wherein:

said wheel includes a plurality of slotted openings in said recessed hub area coaxially disposed with and encircling said support collar.

5. The high strength wheel and interchangeable decorative member as defined in claim 4 including:

sealing means disposed between said decorative means and the wheel;

a plurality of decorative cut-outs provided in said decorative member.

* * * * *